E. L. BARNETT.
Cotton Planter.

No 79,433. Patented June 30, 1868.

Witnesses.
Jacob Henry
Louis Brodhag

Inventor
E. L. Barnett
By Niedersheim & Co
Attorney

United States Patent Office.

EDWIN L. BARNETT, OF EL DORADO, ARKANSAS.

Letters Patent No. 79,433, dated June 30, 1868.

IMPROVEMENT IN COTTON-PLANTERS.

The Schedule referred to in these Letters Patent and making part of the same.

TO ALL WHOM IT MAY CONCERN:

Be it known that I, EDWIN L. BARNETT, of El Dorado, in the county of Union, and State of Arkansas, have invented a new and useful Improvement in Cotton-Planters; and I do hereby declare the following to be a full and correct description of the same, sufficient to enable others skilled in the art to which my invention appertains to fully understand and use the same, reference being had to the accompanying drawings, which make part of this specification, and in which—

Figures 1, 2:
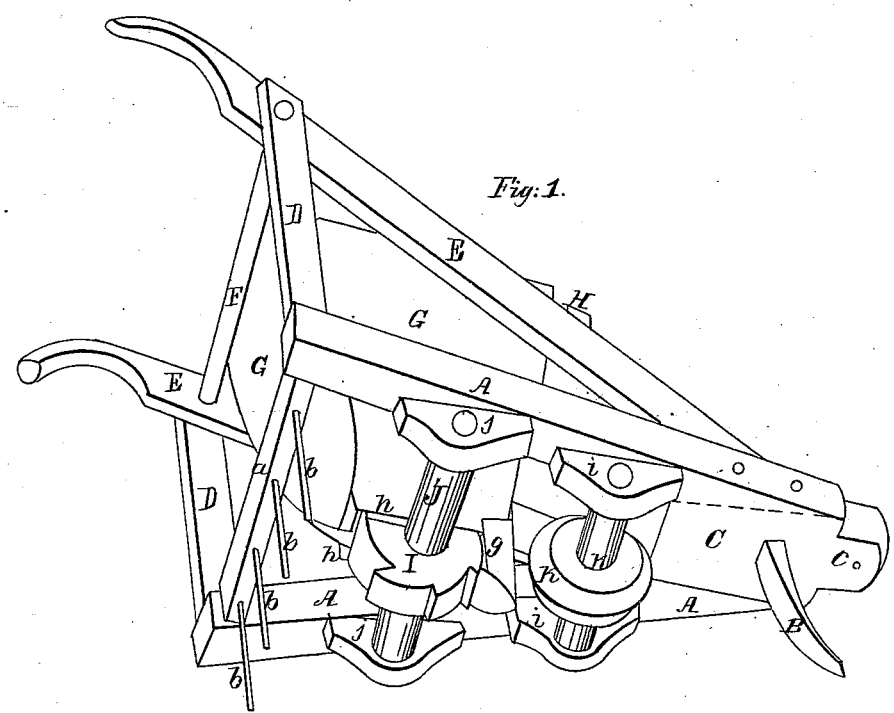
Figure 1 is an under side perspective view of my improved cotton-planter.
Figure 2 is a side elevation of the same.

My invention consists in the combination, in a simple hand-planter, of all the necessary devices for breaking the ground, making the furrow, dropping the seed singly and covering it with ground; the machine itself being such that it can be easily and cheaply constructed, and thus be within the reach of even the smallest cotton-raiser.

A, in the drawing, represents the main frame, in the front piece C of which the breaking-plow B is secured. From the rear of the frame A rise two standards, D, to the ends of which handles, E, are secured. The handles E converge towards each other in front, and are secured to the part C of the main frame in any convenient manner. A rod or bar, F, passes through the handles E into the standards D, and to it is secured the rear end of the hopper G, constructed of wood or metal, as may be deemed most appropriate and convenient. The front end of this hopper is secured to a cross-bar, H, on the handles E, and the sides are curved, and approach each other at the bottom, so as to allow sufficient space to allow a cogged wheel, I, to easily move between their flanges $h$. This wheel H is secured on a shaft, J, which has its bearings in hangers, $j$, attached to the under side of main frame A. Projecting down from the front of the hopper G is a shield or funnel, $g$, between the inner side of which and the cogs of the wheel I there is just sufficient room to allow the seed to drop in such quantity as may be desired.

K represents a furrowing-wheel, with a Λ-shaped bevelled edge, which makes a furrow, the centre of which is in line with the centre of the cogged wheel I.

This furrowing-wheel is secured on a shaft, $k$, which has its bearings in hangers $i$. From the rear, $a$, of the frame A project teeth, $b$, which serve to cover the furrow made by wheel K.

The operation of the planter will be easily understood. While plow B breaks the ground, the wheel K makes a deep and clean furrow, into which the seed drops through the funnel $g$ from the hopper G in quantities regulated by the cogged wheel I. The furrow is covered with loose ground by the teeth $b$.

The advantage of my device consists especially in its simplicity, as it combines all necessary devices for the successful planting of cotton in a machine which can be constructed at a very little expense, and thus is within the reach of even the poorest planter.

Having thus described my invention, what I claim as new, and desire to secure by Letters Patent, is—

The cotton-planter, consisting of the main frame A, standards D, handles E, breaking-plow B, furrowing-wheel K, cogged wheel I, hopper G provided with a shield, $g$, and teeth $b$, all arranged, combined, and constructed substantially as described.

The above specification of my improvement in cotton-seed planters signed, this 23d day of December, 1867.

EDWIN L. BARNETT.

Witnesses:
P. BUMAN,
C. W. LOCKE.